(12) United States Patent
Matysik

(10) Patent No.: US 9,587,996 B2
(45) Date of Patent: Mar. 7, 2017

(54) MACHINE ELEMENT AND ARRANGEMENT FOR MEASURING A FORCE OR A MOMENT AS WELL AS A METHOD FOR PRODUCING THE MACHINE ELEMENT

(71) Applicant: Schaeffler Technologies AG & Co. KG, Herzogenaurach (DE)

(72) Inventor: Jan Matysik, Nurnberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/804,600

(22) Filed: Jul. 21, 2015

(65) Prior Publication Data

US 2016/0025579 A1   Jan. 28, 2016

(30) Foreign Application Priority Data

Jul. 22, 2014   (DE) .................. 10 2014 214 249

(51) Int. Cl.
*G01L 3/00* (2006.01)
*G01L 3/10* (2006.01)
(Continued)

(52) U.S. Cl.
CPC ................ *G01L 3/102* (2013.01); *B05D 7/14* (2013.01); *B05D 7/54* (2013.01); *G01L 1/125* (2013.01); *G01L 5/0061* (2013.01)

(58) Field of Classification Search
CPC . G01L 3/102; G01L 3/101; G01L 3/10; G01L 3/08; G01L 3/1457; G01L 3/24; G01L 25/003; G11B 5/842
(Continued)

(56) References Cited

U.S. PATENT DOCUMENTS 5,052,232 A * 10/1991 Garshelis ................ G01L 3/102
                                                 73/862.336
5,321,985 A    6/1994 Kashiwagi et al.
(Continued)

FOREIGN PATENT DOCUMENTS

DE         3940220        6/1990
DE         69222588      10/1997
(Continued)

*Primary Examiner* — Lisa Caputo
*Assistant Examiner* — Nigel Plumb
(74) *Attorney, Agent, or Firm* — Volpe and Koenig, P.C.

(57) ABSTRACT

A machine element designed for transferring a force and/or a torque and also for measuring the force or the torque to be transferred, as well as to an arrangement for measuring a force and/or a torque having such a machine element. A method for producing the machine element is also provided. The machine element according to the invention has a primary sensor for measuring the force to be transferred or the torque to be transferred and this sensor has a permanent magnetization. A measurable magnetic field occurring outside of the machine element is caused by the permanent magnetization and also by the force and/or by the torque. The permanent magnetization extends along a closed magnetization path. The permanent magnetization is formed in a surface layer of the machine element that has a greater magnetic permeability than at least the sections of the machine element located under the surface layer.

12 Claims, 9 Drawing Sheets

(51) Int. Cl.
*B05D 7/14* (2006.01)
*B05D 7/00* (2006.01)
*G01L 5/00* (2006.01)
*G01L 1/12* (2006.01)

(58) Field of Classification Search
USPC ...... 73/862.335, 862.333, 862.331, 862.325, 73/862.321, 862.191, 862.08, 862; 427/128
See application file for complete search history.

(56) References Cited

U.S. PATENT DOCUMENTS

| | | | | |
|---|---|---|---|---|
| 7,752,923 | B2* | 7/2010 | Shimizu | G01L 3/102 73/862.325 |
| 8,191,431 | B2* | 6/2012 | Hedayat | G01L 3/102 73/862.331 |
| 2007/0022809 | A1* | 2/2007 | Yoshida | G01L 3/102 73/200 |

FOREIGN PATENT DOCUMENTS

| | | | | |
|---|---|---|---|---|
| DE | 69132101 | | 4/2000 | |
| DE | 60008543 | | 12/2004 | |
| DE | 60200499 | | 5/2005 | |
| DE | 69838904 | | 1/2009 | |
| EP | 0162957 | | 12/1984 | |
| EP | 0525551 | | 2/1993 | |
| EP | 0525551 | A2 * | 3/1993 | ............... G01L 3/10 |
| EP | 2216702 | | 8/2010 | |
| EP | 2216702 | * | 11/2010 | ............. G05D 17/00 |
| JP | 59192930 | | 11/1984 | |
| JP | S59192930 | | 11/1984 | |
| WO | 0127638 | | 4/2001 | |
| WO | 2006053244 | | 5/2006 | |
| WO | 2007048143 | | 4/2007 | |

* cited by examiner

MACHINE ELEMENT AND ARRANGEMENT FOR MEASURING A FORCE OR A MOMENT AS WELL AS A METHOD FOR PRODUCING THE MACHINE ELEMENT

INCORPORATION BY REFERENCE

The following documents are incorporated herein by reference as if fully set forth: German Patent Application No. 10 2014 214 249.0, filed Jul. 22, 2014.

BACKGROUND

The present invention first relates to a machine element that is designed for transferring a force and/or a torque and also for measuring the force to be transferred or the torque to be transferred. The invention also relates to an arrangement for measuring a force and/or a torque, wherein this arrangement comprises the machine element according to the invention. The invention further relates to a method for producing the machine element according to the invention.

U.S. Pat. No. 5,321,985 teaches a magnetostrictive torque sensor, in which a magnetostrictive layer is deposited on the outer surface of a shaft and is positioned opposite excitation and detection coils. The magnetostrictive layer can be charged by the excitation coils with a magnetic field, wherein the magnetic field emerging from the magnetostrictive layer can be measured with the detection coils. A torque acting on the shaft causes material stress in the magnetostrictive layer, whereby the relative magnetic permeability of the magnetostrictive layer changes as a function of the direction.

US 2007/0022809 A1 shows a device for measuring torques, in which a layer is formed from a magnetostrictive material in a shaft. This layer comprises an aluminum diffusion layer.

DE 39 40 220 A1 teaches a load sensor for measuring loads due to a torque acting on a shaft. Magnetostrictive elements are applied in two groups in a zig-zag pattern on the shaft. With the help of sensing coils, a magnetic flux is caused by the magnetostrictive elements.

From U.S. Pat. No. 5,052,232, a magnetoelastic transducer is known, in which a machine element is provided with two surrounding magnetostrictive coatings. The coatings have opposing, helix-like magnetizations.

From DE 698 38 904 T2, a torque sensor with circular magnetization is known. The magnetization is formed in a ferromagnetic, magnetostrictive material of a shaft and extends in a circle about the shaft.

U.S. Pat. No. 7,752,923 B2 shows a magnetostrictive torque sensor, in which a magnetically insulating layer and on this layer a magnetostrictive layer are deposited on a shaft. The magnetically insulating and electrically conductive layers are formed as a hollow cylinder and pressed onto the element exposed to torque.

EP 0 162 957 A1 teaches a method for measuring a mechanical stress on a shaft utilizing magnetostrictive properties of a magnetic material arranged on the shaft. Between the shaft and the magnetic material there is a non-magnetic carrier sleeve that is deposited on the shaft with a non-positive fit.

DE 602 00 499 T2 shows a position sensor with a magnetic structure made from two ferromagnetic collars.

DE 691 32 101 T2 shows a magnetic image sensor with a wire that has magnetization in the circumferential direction.

From DE 692 22 588 T2, a ring-shaped, magnetized torque sensor is known.

WO 2007/048143 A2 teaches a sensor with a magnetized shaft.

WO 01/27638 A1 shows an oscillation sensor with a shaft that is magnetized in the circumferential or longitudinal direction.

From WO 2006/053244 A2, a torque sensor is known that comprises magnetization on a rotating shaft. The magnetization has a circumferential construction.

U.S. Pat. No. 8,191,431 B2 shows a sensor arrangement with a magnetized shaft.

From DE 600 08 543 T2, a converter element is known that is provided for use in a torque or force sensor. The converter element is integrated into a shaft made from a magnetizable material and has magnetization oriented in an axial direction.

From JP 59-192930 A it is known to use a magnetic field sensor to determine the torque applied to a rotating shaft, wherein an anisotropic magnetic layer is deposited on the surface of the shaft. The layer is not permanently magnetized itself, but instead magnetized by a permanent magnet in one direction.

SUMMARY

The objective of the present invention, starting from the prior art, is to improve the magnetization needed for measuring the forces and/or torques according to the inverse-magnetostrictive effect with respect to stability and service life. In particular, stability against influences of temperature, remagnetization, and mechanical influences, such as impacts or vibrations, is to be improved. A measure for stability is, in particular, the magnitude of remanence flux density, which in all cases should change only slightly over the service life.

This objective is achieved by a machine element and by an arrangement according to the one or more aspects of the invention, as well as by a method according to one or more aspects of the invention.

The machine element according to the invention is used, on one hand, for transferring a force and/or a torque within a machine. The force or the torque acts on the machine element, which leads to mechanical stress and at least slightly deforms the machine element.

The machine element extends preferably in an axis that is preferably a rotational axis of the machine element.

The machine element according to the invention enables, on the other hand, the measurement of the force to be transferred or the torque to be transferred. For this purpose, it has a primary sensor for measuring the force to be transferred or the torque to be transferred, wherein this sensor has a permanent magnetization. Due to the inverse-magnetostrictive effect, the permanent magnetization, as well as the force and/or the torque, causes a magnetic field that can be measured outside of the machine element and can be measured, in particular, with a secondary sensor formed by a magnetic field sensor. The primary sensor, i.e., the permanent magnetization, is used for converting the force to be measured or the torque to be measured into a corresponding magnetic field, while the secondary sensor enables the conversion of the magnetic field into an electrical signal.

The permanent magnetization extends along a closed magnetization path, so that the magnetization path is endless. The magnetization path runs in the material of the machine element. In an area around the magnetization path, the material of the machine element is permanently magnetized. Outside of this area, the machine element is preferably not magnetized. The magnetization path preferably has, at least in some sections, a tangential component with respect to the axis of the machine element. The permanent magnetization along the magnetization path is preferably embedded or impressed or encoded as remanent magnetization in the machine element.

According to the invention, the permanent magnetization is formed in a surface layer of the machine element that has, in particular, in a state unloaded from the force or the torque, a greater magnetic permeability than at least the sections of the machine element located under the surface layer. Preferably the surface layer has a greater magnetic permeability than all of the sections of the machine element located under the surface layer. The surface layer is preferably formed only in partial areas of the surface of the machine element. In an especially preferred way, the surface layer is formed only in the area of the permanent magnetization. Preferably, the permanent magnetization is formed only within the surface layer. The surface layer can be arranged on a machine element base body.

One essential advantage of the machine element according to the invention is provided in that the surface layer with the closed magnetization path located there guarantees a stable permanent magnetization.

The surface layer preferably is formed of a magnetostrictive material, so that the force or torque that occurs can be measured according to the inverse-magnetostrictive effect.

One special property of the permanent magnetization along the closed magnetization path is that, in the unloaded state, it results in a magnetic field that can be detected from the outside. Therefore, the permanent magnetization is preferably magnetically neutral outside of the machine element in a state that is not loaded by the force and/or by the torque. In principle, however, a slight or negligibly small magnetic field could be measured.

The permanent magnetization is preferably formed by a magnetized three-dimensional partial area of the volume of the machine element that has the shape of a closed cord, wherein the magnetization path is a center axis of the cord. The cord located in the surface layer preferably has a circular or rectangular cross section. The cross section could also be flattened, for example, in the shape of a flattened superellipse or a flat rectangle. Preferably, the cross section of the cord does not change along the extent of the cord. However, the cross section of the cord could also change along the extent of the cord.

The magnetization path is preferably formed by a closed three-dimensional curve in space. This curve runs in the surface layer of the machine element, in particular, through the material of the surface layer of the machine element. In principle, the curve can have any shape, in particular, the curve could also have an irregular shape.

The magnetization path or the three-dimensional curve is preferably axis-symmetrical. The magnetization path or the three-dimensional curve thus has at least one axis of symmetry.

The surface layer can also be formed in a hollow space of the machine element. The surface layer could also have different layer thicknesses. The magnetization path can run in different depths of the surface layer, for example, also through recesses.

The magnetization path or the three-dimensional curve could also extend circumferentially around a recess in the machine element. The recess could be, for example, a hole that is arranged radially in the machine element.

Preferably, the orientation of the permanent magnetization relative to the axis changes along the magnetization path. Thus, the orientation of the magnetization path also changes along its extent with respect to the axis. Thus there are sections of the magnetization path that have different orientations with respect to the axis.

In preferred embodiments of the machine element according to the invention, the magnetization path extends with a center point angle of at least 360° over the circumference of the machine element. Consequently, the magnetization path extends more than one revolution around the machine element. The apex of the center point angle lies in the axis of the machine element.

In alternatively preferred embodiments, the magnetization path extends with a center point angle less than 360° over the circumference of the machine element, so that the magnetization path reaches less than one revolution around the machine element.

In a first group of preferred embodiments of the machine element according to the invention, the magnetization path closes around the axis, so that the axis runs through the interior of the closed magnetization path. In this first group of preferred embodiments, the magnetization path closes around the circumference of the machine element.

In the first group of preferred embodiments, the magnetization path is preferably formed by a closed zig-zag line or by a closed wavy line that extends around the circumference of the machine element and closes.

In a second group of preferred embodiments of the machine element according to the invention, the magnetization path is formed by a closed curve that is projected onto the surface layer, so that the magnetization path closes within the surface layer without inclusion of the axis. In this second group of preferred embodiments, the axis does not run through the interior of the closed magnetization path, although the magnetization path can extend over a center point angle of greater than 360° about the axis.

In the second group of preferred embodiments, the magnetization path is preferably formed by a circle, an ellipse, a superellipse, a square, a trapezoid, a rectangle, or a parallelogram. The circle, ellipse, superellipse, square, trapezoid, rectangle, triangle, or the parallelogram is projected onto the surface layer.

The sides of the parallelogram, square, trapezoid, or triangle, or the axes of the ellipse or the superellipse can be parallel or perpendicular to the axis or else preferably also inclined relative to the axis of the machine element. Different angles of inclination can also be realized.

In preferred embodiment of the machine element according to the invention, there are multiple permanent magnetizations. The multiple permanent magnetizations along each magnetization path preferably have an identical or mirrored form with respect to each other. Also, the multiple permanent magnetizations are preferably oriented in the same way relative to the axis. The multiple permanent magnetizations can be arranged at a distance to each other or adjacent to each other. The polarity of the multiple permanent magnetizations preferably alternates between adjacent permanent magnetizations. The multiple permanent magnetizations could also have different shapes in order to be able to simultaneously measure different components of the magnetic field caused by the permanent magnetization and also by the force and/or by the torque. In principle, there could be multiple permanent magnetizations forming the primary sensor geometries in the machine element, i.e., several of the surface layers and several of the magnetization paths could be formed. These multiple permanent magnetizations could have different geometry orientations, different geometrical shapes, different magnetization directions, and/or different magnetization intensities.

The edge of the surface layer preferably also forms an edge of the permanent magnetization along the magnetization path. Thus, the surface layer preferably has the same extent and shape as the permanent magnetization along the magnetization path. In principle, however, the surface layer could also extend beyond the permanent magnetization.

The surface layer has a greater magnetic permeability, in particular, a greater relative magnetic permeability than the sections of the machine element located directly underneath. Preferably the surface layer has a magnetic permeability that is several times greater than at least the sections of the machine element located underneath. In an especially preferred way, the surface layer has a magnetic permeability that is more than 100 times greater than the sections of the machine element located under the surface layer. The sections of the machine element located under the surface layer are preferably non-magnetic, i.e., not ferromagnetic and not or only slightly magnetostrictive.

The surface layer preferably has a smaller magnetic resistance than at least the sections of the machine element located under the surface layer. In an especially preferred way, the surface layer has a magnetic resistance that is several times smaller than at least the sections of the machine element located under the surface layer.

The surface layer is preferably highly remanent, while the sections of the machine element located under the surface layer are not or only slightly remanent.

The surface layer is preferably magnetically hard, while the sections of the machine element located under the surface layer are magnetically soft or more preferably no-magnetic.

The surface layer preferably has highly magnetostrictive properties. Therefore, the surface layer preferably has a magnetostrictive constant that is, in terms of magnitude, more than 10-times as large as the magnetostrictive constant of the sections of the machine element located under the surface layer.

The surface layer preferably has a greater magnetic permeability than all of the sections of the machine element located under the surface layer. The surface layer preferably has a magnetic permeability that is greater than 100-times that of all of the sections of the machine element located under the surface layer. The machine element is preferably non-magnetic, in particular, paramagnetic or diamagnetic, apart from the surface layer.

In preferred embodiments of the machine element according to the invention, a magnetic insulation layer, i.e., a magnetically insulating layer, which is formed in the machine element, is arranged under the surface layer. The magnetic insulation layer is non-magnetic, in particular, paramagnetic or diamagnetic. It has a slight permeability. Here, areas of the machine element arranged under the magnetic insulation layer can be nevertheless magnetic, in particular, ferromagnetic. The magnetic insulation layer can be arranged on a machine element base body.

The magnetic insulation layer preferably projects past the edge of the surface layer, so that the magnetic insulation layer also magnetically insulates the surface layer on its lateral edge.

In alternatively preferred embodiments, on the lateral edge of the surface layer there is a magnetic insulation edge that is formed in the machine element and also magnetically insulates the surface layer on its lateral edge.

The surface layer is preferably deposited chemically, mechanically, thermally, or thermomechanically onto the section of the machine element located underneath. Thus it is one layer deposited by a coating process. Suitable coating technologies are available for almost all materials.

The surface layer is preferably deposited chemically, mechanically, thermally, or thermomechanically onto the magnetic insulation layer. Thus, it is a layer deposited on the magnetic insulation layer by a coating process.

The magnetic insulation layer is preferably deposited chemically, mechanically, thermally, or thermomechanically on the section of the machine element located underneath. Thus it is one layer deposited by a coating process.

In alternative preferred embodiment, the surface layer is diffused into the machine element. Thus it is a layer formed by diffusion. Likewise, the magnetic insulation layer is alternatively diffused preferably into the machine element, so that it is a layer formed by diffusion. The diffusion can be applied, in particular, in metallic materials.

The formation of the surface layer or the magnetic insulation layer by a chemical, mechanical, thermal, or thermomechanical coating and the formation of the magnetic insulation layer or the surface layer by diffusion can be combined.

In special embodiments, the machine element has a mechanically fixed ring on which the surface layer and optionally also the magnetic insulation layer are located. This embodiment must be selected if the base material of the machine element is not suitable for forming the surface layer and optionally also the magnetic insulation layer, so that a suitable material can be selected for the ring.

The machine element preferably has the shape of a prism or a cylinder, wherein the prism or cylinder is arranged coaxial to the axis. The prism or cylinder is preferably straight. It is especially preferred for the machine element to have the shape of a straight circular cylinder, wherein the circular cylinder is arranged coaxial to the axis. In special embodiments, the prism or the cylinder has a conical shape. The prism or cylinder could also be hollow.

The machine element is preferably formed by a shaft, a hollow shaft, a selector fork, or a flange. The shaft, the selector fork, or the flange could be designed for loads by different forces and torques. In principle, the machine element could also be formed by machine element types that are completely different.

The arrangement according to the invention is used for measuring a force and/or a torque on the machine element according to the invention. This arrangement at first comprises the machine element according to the invention and also at least one secondary sensor that is formed by a magnetic field sensor and is designed for measuring at least one component of a magnetic field caused by the permanent magnetization, as well as by the force and/or by the torque. The secondary sensor is used for converting the magnetic field into an electrical signal that is thus dependent on the force to be measured or on the torque to be measured.

The arrangement according to the invention preferably comprises one of the preferred embodiments of the machine element according to the invention.

The machine element preferably forms an integral part of the arrangement.

The one or more magnetic field sensors are preferably formed by Hall sensors, coils, saturable reactors, or flux-gate magnetometers. In principle, other types of sensors could also be used, as long as they are suitable for measuring the magnetic fields caused by the inverse-magnetostrictive effect.

The method according to the invention is used for producing the machine element according to the invention, in particular, for forming the surface layer of the machine element.

In one step of the method according to the invention, a machine element base body is provided, on or in which the surface layer is to be formed. The machine element base body already has the mechanical properties that are needed for transferring the force to be transferred from the machine element or the torque to be transferred from the machine element. The machine element base body can comprise a ring that is pressed on.

In another step of the method according to the invention, a surface layer is formed on or in the machine element base body. The surface layer has a permanent magnetization, wherein the surface layer has a greater magnetic permeability than at least the sections of the machine element located underneath the surface layer. The permanent magnetization extends along a closed magnetization path.

In principle, the surface layer can be formed by a coating process on the machine element base body or by a diffusion process in the machine element base body.

In preferred embodiments of the method according to the invention, the formation of the surface layer is performed such that the surface layer is deposited chemically, mechanically, thermally, or thermomechanically onto the section of the machine element located underneath. In this way the section of the machine element located underneath is applied. In a simple case, the formation of the surface layer is performed such that the surface layer is deposited chemically, mechanically, thermally, or thermomechanically onto the machine element base body, for example, in particular, onto the ring.

Preferably, a magnetic insulation layer is also formed under the surface layer. In this case, the formation of the surface layer with the permanent magnetization is preferably performed such that the surface layer is deposited chemically, mechanically, thermally, or thermomechanically onto the magnetic insulation layer.

The formation of the magnetic insulation layer preferably takes place such that the insulation layer is deposited chemically, mechanically, thermally, or thermomechanically onto the machine element base body. In this way, the machine element base body, for example, in particular, the ring, is coated.

In alternatively preferred embodiments of the method according to the invention, the formation of the surface layer is performed such that this is diffused into the machine element base body or into the magnetic insulation layer. The formation of the magnetic insulation layer could also be performed alternatively such that this is diffused into the machine element base body.

A magnetic insulation edge is preferably formed on the lateral edge of the surface layer, in particular, when the machine element has magnetically insulating properties under the surface layer. The magnetic insulation edge is preferably diffused into the machine element base body.

The formation of the surface layer or the magnetic insulation layer by a coating process and the formation of the insulation layer or the surface layer by diffusion can be combined together. For example, the surface layer can be applied by a coating process on the diffused insulation layer.

BRIEF DESCRIPTION OF THE DRAWINGS

Additional details, advantages, and refinements of the invention are given in the following description of preferred embodiments of the invention, with reference to the drawing. Shown are.

DETAILED DESCRIPTION OF THE PREFERRED EMBODIMENTS

Figure 1:
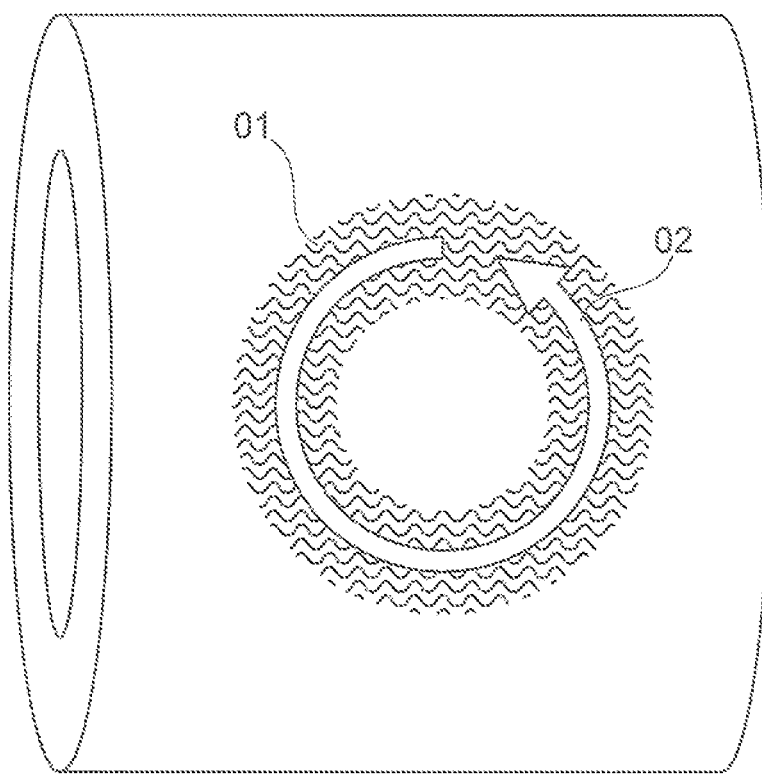
FIG. 1 a perspective view of a simple embodiment of a machine element according to the invention.

FIG. 1 shows a perspective view of a simple embodiment of a machine element according to the invention. This machine element is a hollow shaft that can be exposed to various forces and torques that can be measured according to the invention. The basic material of the machine element is, for example, soft-magnetic steel.

On the lateral surface of the hollow shaft, a surface layer 01 is formed that has, in the illustrated simplified embodiment, the shape of a projected circular ring. The surface layer 01 is formed of a magnetostrictive material and is magnetically hard. In the surface layer 01, a permanent magnetization is formed that extends along a magnetization path 02 and forms a primary sensor. The magnetization path 02 is closed. In the illustrated simplified embodiment, the magnetization path 02 is closed along a circle. Because the magnetization path 02 is closed, the permanent magnetization does not act toward the outside as long as no force and no torque act on the machine element.

According to the invention, the magnetization path 02 is not bound to the circular shape, but instead could be formed in any shape, for example, even as a freeform shape. The free shaping leads to improved compensation options with respect to external magnetic fields and effects of temperature, also, in particular, with respect to large temperature gradients. For this purpose, the geometry of the primary sensor, i.e., the magnetization path, is to be detected at different positions with a secondary sensor (not shown) formed by a magnetic field sensor, wherein different measured values can be obtained that can be used for compensation by offsetting.

Figure 2:
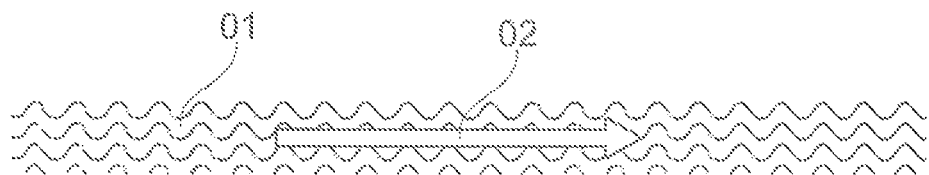
FIG. 2 a section view of a surface layer shown in FIG. 1.

FIG. 2 shows a section view of the surface layer 01 shown in FIG. 1 with the magnetization path 02 arranged therein. The permanent magnetization symbolized by the magnetization path 02 is formed exclusively within the surface layer 01.

Figure 3:
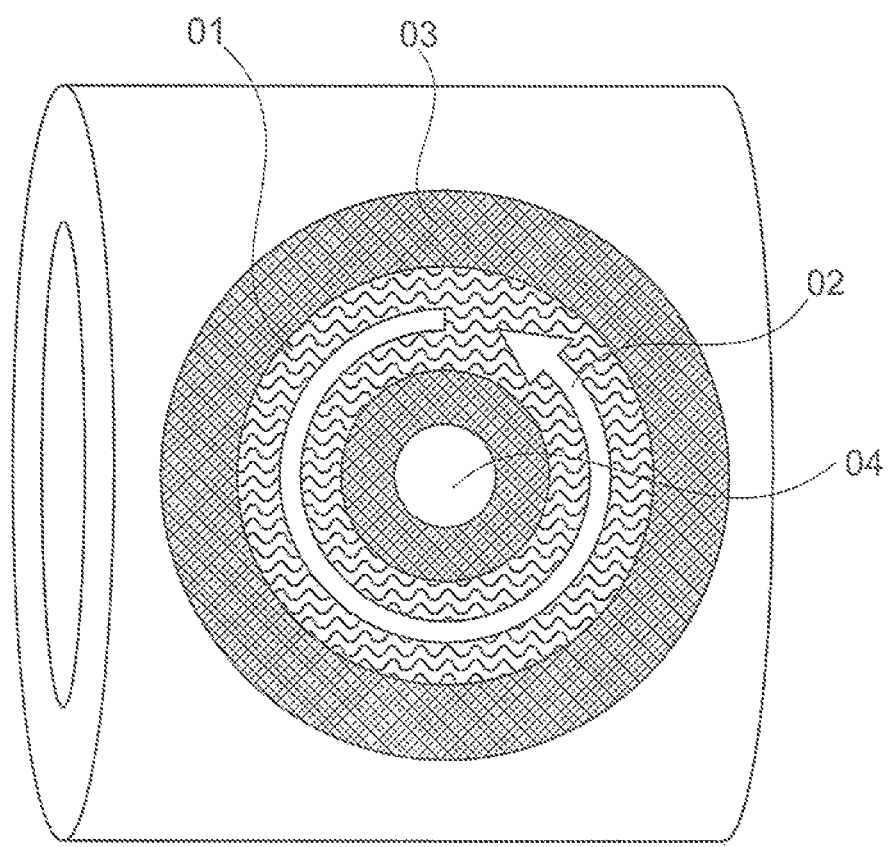
FIG. 3 a perspective view of a preferred embodiment of the machine element according to the invention.

FIG. 3 shows a perspective view of a preferred embodiment of the machine element according to the invention. This machine element is, in turn, a hollow shaft. The surface layer 01 with the permanent magnetization formed therein along the magnetization path 02 is the same as the embodiment shown in FIG. 1. In addition, a magnetic insulation layer 03, i.e., a magnetically insulating layer, is formed that is made from a paramagnetic or diamagnetic material. The magnetic insulation layer 03 is arranged under the surface layer 01 and extends past this layer. Thus, the magnetic insulation layer 03 also has a projected circular ring shape, wherein a free space 04 formed in the center is optional.

The magnetic insulation layer 03 has a slightly relative magnetic permeability $\mu_r$ and is used for the magnetic decoupling of the permanent magnetization located in the surface layer 01 with respect to the rest of the machine element made from steel. In this way it is achieved that the surroundings formed of the magnetic insulation layer 03 and air for the permanent magnetization located in the surface layer 01 has a relative magnetic permeability $\mu_r$ of approximately one or lower. These surroundings thus have a high magnetic resistance, wherein the magnetostrictive surface layer 01 has a much greater relative magnetic permeability $\mu_r$ and thus a much smaller magnetic resistance in its surroundings. Therefore the magnetic field density in the surface layer 01 is greater than in the surroundings, which is an important requirement for the stability of the permanent magnetization in the surface layer 01.

Figure 4:
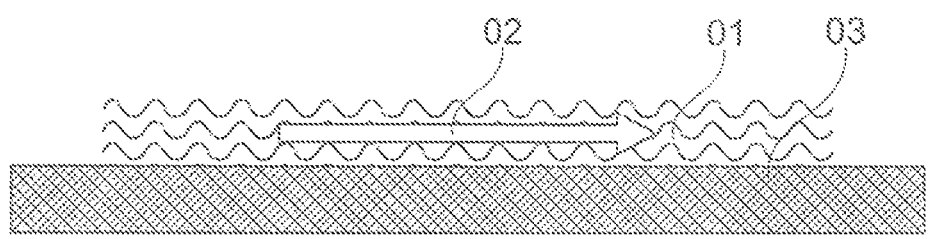
FIG. 4 a first preferred embodiment of the surface layer.

FIG. 4 shows a section view of the surface layer 01 in a first preferred embodiment. The magnetic insulation layer 03 and the surface layer 01 are each deposited by a chemical, mechanical, thermal, or thermomechanical coating process according to DIN 8580.

Figure 5:
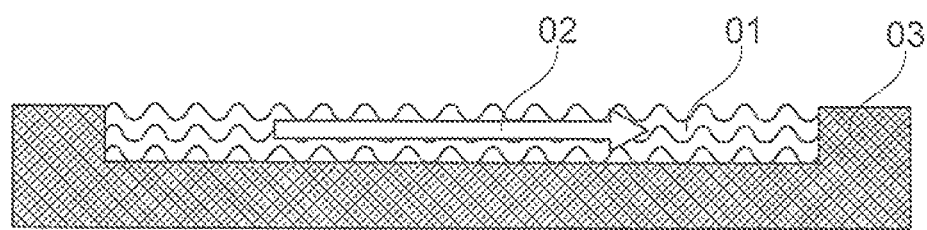
FIG. 5 a second preferred embodiment of the surface layer.

FIG. 5 shows a section view of the surface layer 01 in a second preferred embodiment. The magnetic insulation layer 03 and the surface layer 01 are each formed by diffusion in the material of the machine element. In this way, at first the magnetic insulation 03 having low permeability is formed by diffusion. Then the magnetostrictive surface layer 01 is formed by diffusion in the already formed magnetic insulation layer 03.

Figure 6:
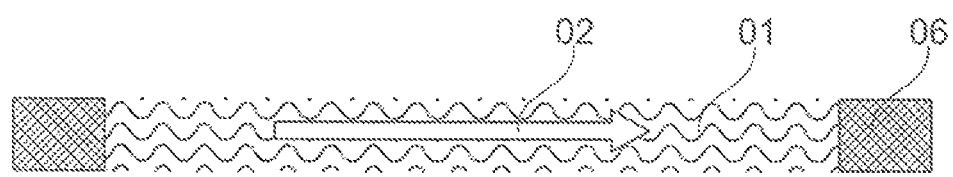
FIG. 6 a third preferred embodiment of the surface layer.

FIG. 6 shows a section view of the surface layer 01 in a third preferred embodiment. In this embodiment, a magnetic insulation edge 06 and the surface layer 01 are each formed by diffusion into the material of the machine element. In this way, at first the magnetostrictive surface layer 01 is formed by diffusion. Then the magnetic insulation edge 06 is formed by the magnetostrictive surface layer 02 by diffusion.

Figure 7:
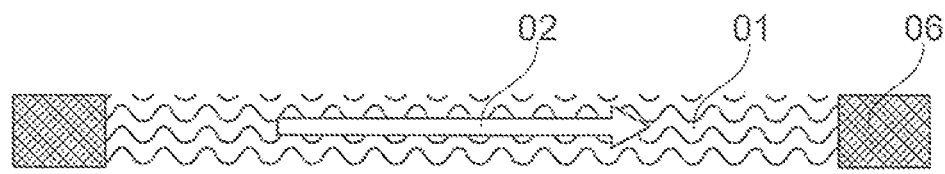
FIG. 7 a fourth preferred embodiment of the surface layer.

FIG. 7 shows a section view of the surface layer 01 in a fourth preferred embodiment. In this embodiment, the magnetic insulation edge 06 is generated by a coating process, while the surface layer 01 is formed by diffusion. In this way, at first the magnetic insulation layer 03 (shown in FIG. 3) is formed by a coating process, whereupon the magnetostrictive surface layer 01 is introduced by diffusion into the magnetic insulation layer 03 (shown in FIG. 3), which has the result that only the magnetic insulation edge 06 remains.

Figure 8:
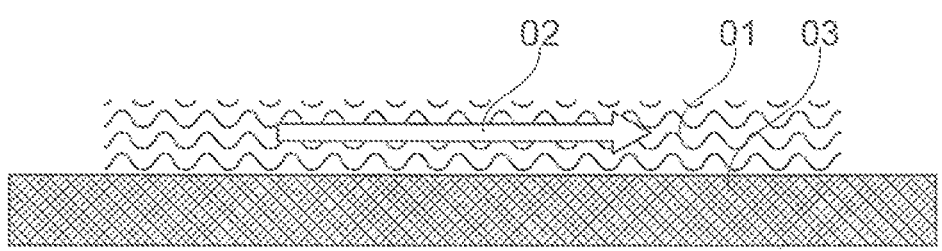
FIG. 8 a fifth preferred embodiment of the surface layer.

FIG. 8 shows a section view of the surface layer 01 in a fifth preferred embodiment. In this embodiment, the surface layer 01 is formed by a coating process, while the magnetic insulation layer 03 is formed by diffusion. In this way, at first the magnetic insulation layer 03 is formed by diffusion, whereupon the magnetostrictive surface layer 01 is applied by a coating process onto the magnetic insulation layer 03.

Figure 9:
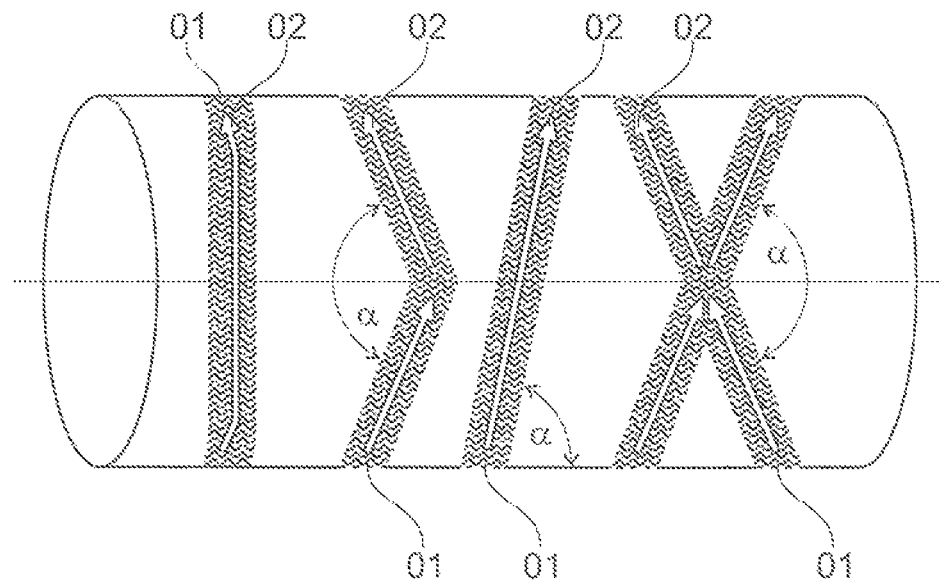
FIG. 9 a perspective view of the machine element according to the invention with different magnetization paths.

FIG. 9 shows a perspective view of the machine element according to the invention with the different magnetization paths 02. The magnetization path 02 shown at the first position runs tangentially over the entire circumference of the machine element, so that it has a center point angle of 360°. The magnetization path 02 thus has a circular shape.

The magnetization path 02 shown at the second position runs as a zig-zag line over the entire circumference of the machine element, so that it has a center point angle of 360°. The zig-zag line is assembled from short sections of the magnetization path 02 that have an identical angle $0°<\alpha<180°$ relative to each other.

The magnetization path 02 show at the third position runs at an angle to the tangential direction around the entire circumference of the machine element, so that it likewise has a center point angle of 360°. This orientation of the magnetization path 02 can also be described as diagonal to the machine element.

The magnetization path 02 shown at the fourth position comprises two magnetization paths 02 that are shown at the second position and border each other, so that a repeating X-shape can be formed.

Figure 10:
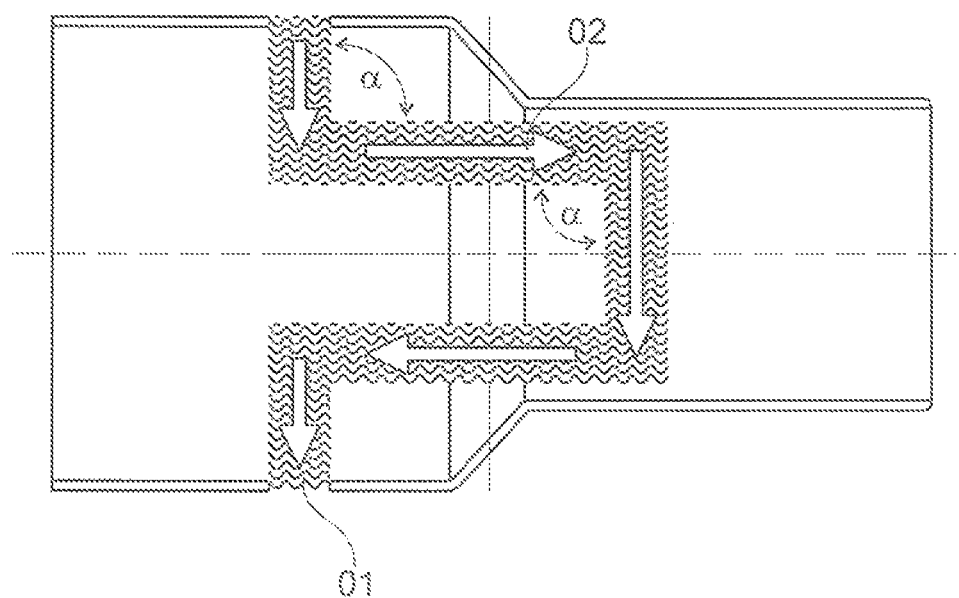
FIG. 10 a modified embodiment of the machine element according to the invention with a magnetization path.

FIG. 10 shows a modified embodiment of the machine element according to the invention with the magnetization path 02. In this embodiment, the machine element is formed by a tapering shaft. The magnetization path 02 runs, on one hand, around the circumference of the shaft and, on the other hand, in the axial direction over the tapering section of the shaft, in that the magnetization path 02 changes its direction multiple times, each time at a right angle $\alpha$. The angle $\alpha$ could also be selected, however, arbitrarily between 0° and 180°.

Figure 11:
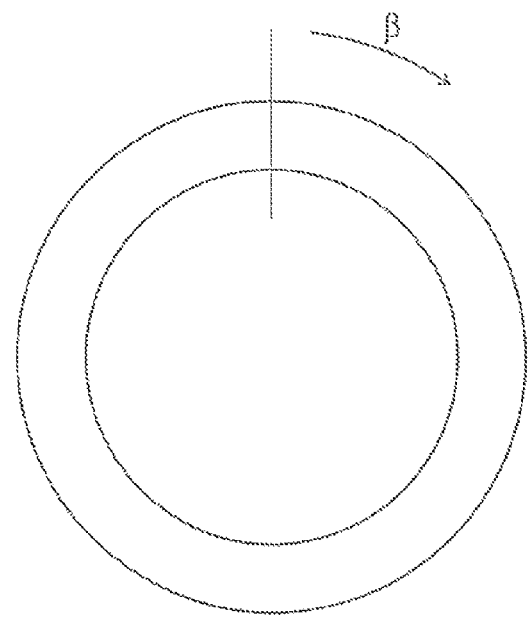
FIG. 11 a preferred embodiment of the machine element according to the invention in a section view.
Figure 12:
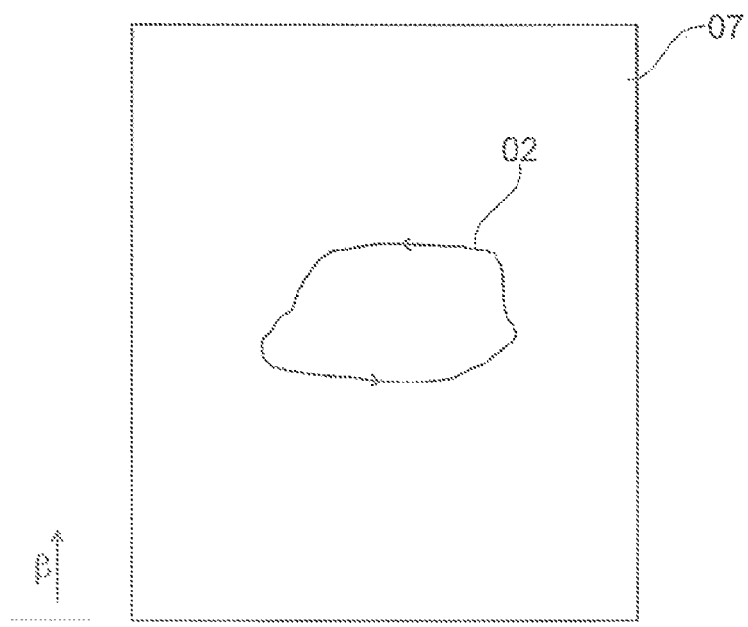
FIG. 12 a magnetization path according to a general embodiment.
Figure 13:
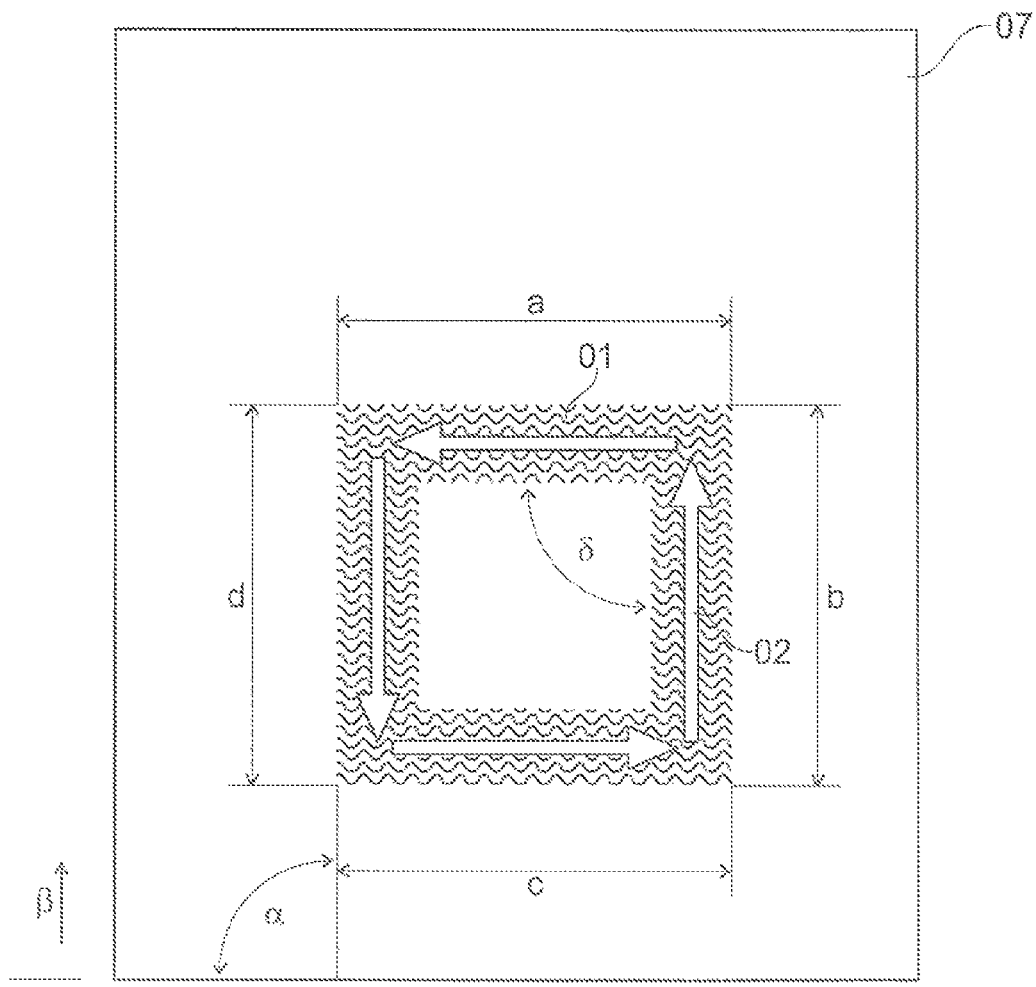
FIG. 13 a magnetization path according to a first preferred embodiment.
Figure 14:
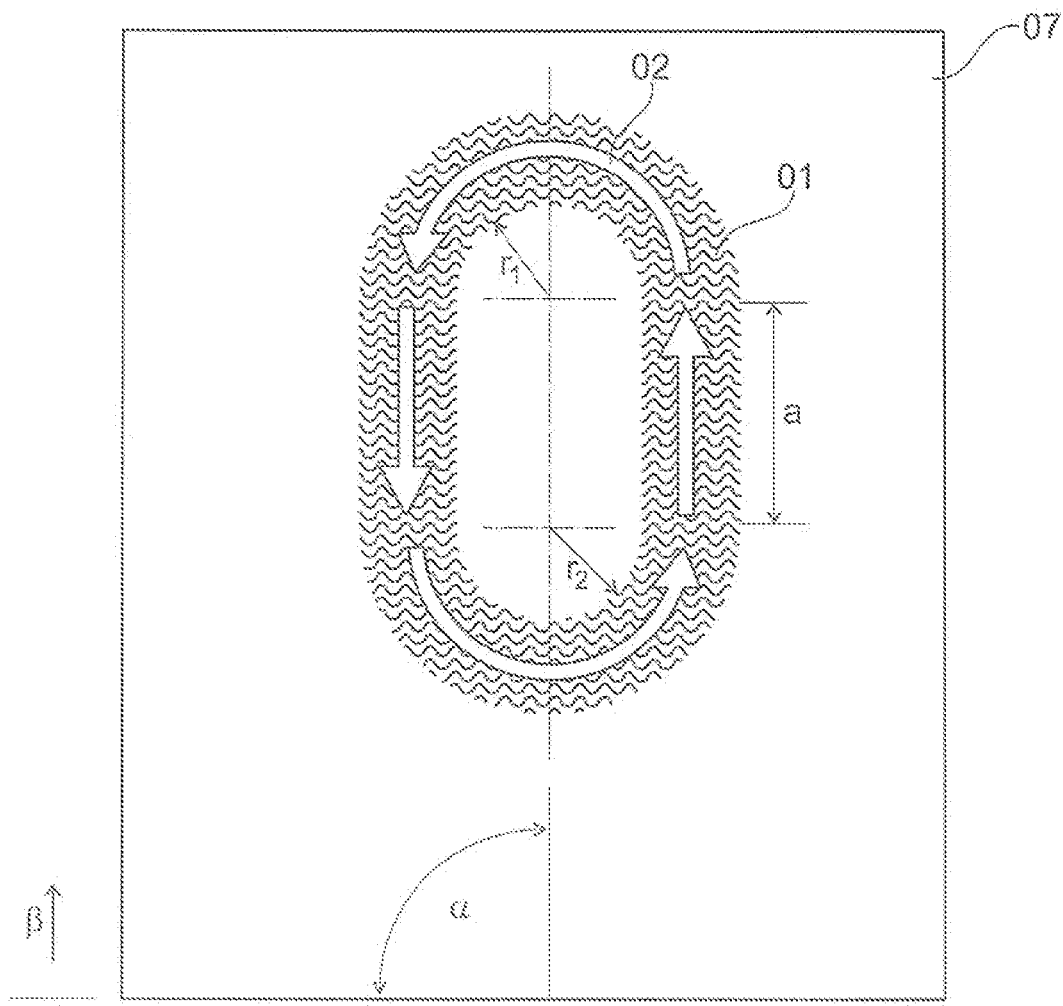
FIG. 14 a magnetization path according to a second preferred embodiment.

FIG. 11 shows a preferred embodiment of the machine element according to the invention in a section view. This machine element is, in turn, a hollow shaft that can be exposed to various forces and torques. An angle $\beta$ is shown. FIG. 12 to FIG. 14 contain representations of the machine element with respect to the angle $\beta$. FIG. 12 to FIG. 14 show a cylindrical, sleeve-shaped surface 07 of different embodiments, wherein the cylindrical, sleeve-shaped surface 07 is shown by unrolling the hollow shaft by the angle $\beta$. Accordingly, the cylindrical, sleeve-shaped surface 07 of the hollow shaft is shown as a rectangle.

FIG. 12 shows the magnetization path 02 according to a general embodiment.

The magnetization path 02 runs on the cylindrical sleeve-shaped surface 02 of the machine element (shown in FIG. 11). The magnetization path 02 is closed and has, in the shown general embodiment, an irregular shape. The direction of the magnetization path 02, i.e., the orientation of the permanent magnetization can obviously also be realized in the opposite direction.

FIG. 13 shows the magnetization path 02 according to a first preferred embodiment. In the unrolled representation, the magnetization path 02 has the shape of a square. In alternative embodiments, the square can be inclined by changing the angle $\alpha$. In other alternative embodiments, a trapezoidal shape, a parallelogram shape, a triangular shape, or another shape of the magnetization path 02 can be achieved instead of a square shape by changing the angle $\delta$ and/or the side lengths a, b, c, d. The vertices of the specified shapes could also be rounded. In principle, the vertices of all of the described embodiments could be rounded, wherein an additional embodiment is formed in each case.

FIG. 14 shows the magnetization path 02 according to a second preferred embodiment. In the unrolled representation, the magnetization path 02 has the shape of a superellipse or an elongated hole. In alternative embodiments, the angle $\alpha$, the radii $r_1$, $r_2$, and the side length a can be changed in any value.

LIST OF REFERENCE SYMBOLS

01 Surface layer
02 Magnetization path

03 Magnetic insulation layer
04 Free space
05 —
06 Magnetic insulation edge
07 Cylindrical sleeve-shaped surface

The invention claimed is:

1. A machine element for transferring at least one of a force or a torque, the machine element comprising a primary sensor for measuring the force to be transferred or the torque to be transferred, said sensor having a permanent magnetization; wherein a measurable magnetic field occurring outside of the machine element is caused by the permanent magnetization and also by the at least one of the force or the torque; the permanent magnetization extends along a closed magnetization path; and the permanent magnetization is formed in a surface layer of the machine element that has a greater magnetic permeability than at least some sections of the machine element located under the surface layer.

2. The machine element according to claim 1, wherein the magnetization path extends with a center point angle of at least 360° over an extent of the machine element, and the magnetization path completes itself around an axis of the machine element.

3. The machine element according to claim 1, wherein the magnetization path extends with a center point angle of less than 360° over an extent of the machine element.

4. The machine element according to claim 1, wherein the magnetization path is formed by a closed curve that is projected onto the surface layer.

5. The machine element according to claim 4, wherein the closed curve does not enclose an axis of the machine element.

6. The machine element according to claim 1, wherein a magnetic insulation layer constructed in the machine element is arranged under the surface layer.

7. An arrangement with a machine element according to claim 1, further comprising at least one secondary sensor that is formed by a magnetic field sensor and is designed for measuring at least one component of a magnetic field caused by the permanent magnetization and also by the at least one of the force or the torque.

8. A method for producing a machine element according to claim 1, comprising:
 preparing a machine element base body; and
 forming a surface layer on the machine element base body, which has a permanent magnetization, the surface layer has a greater magnetic permeability than at least the sections of the machine element located under the surface layer, and wherein the permanent magnetization extends along a closed magnetization path.

9. The method according to claim 8, wherein the surface layer is formed such that the surface layer is deposited chemically, mechanically, thermally, or thermomechanically onto the section of the machine element located underneath.

10. The method according to claim 8, wherein a magnetic insulation layer is also formed under the surface layer.

11. The method according to claim 10, further comprising forming the surface layer with the permanent magnetization by diffusion into the machine element base body or into the magnetic insulation layer.

12. The method according to claim 8, further comprising forming the surface layer with the permanent magnetization by diffusion into the machine element base body.

* * * * *